United States Patent
Gammon

(10) Patent No.: US 9,938,022 B2
(45) Date of Patent: Apr. 10, 2018

(54) FUELING NOZZLE ADAPTER

(71) Applicant: Gammon Technical Products, Inc., Manasquan, NJ (US)

(72) Inventor: James H. Gammon, Manasquan, NJ (US)

(73) Assignee: GAMMON TECHNICAL PRODUCTS, INC., Manasquan, NJ (US)

( * ) Notice: Subject to any disclaimer, the term of this patent is extended or adjusted under 35 U.S.C. 154(b) by 200 days.

(21) Appl. No.: 14/728,197

(22) Filed: Jun. 2, 2015

(65) Prior Publication Data

US 2015/0353340 A1 Dec. 10, 2015

Related U.S. Application Data

(60) Provisional application No. 62/010,128, filed on Jun. 10, 2014.

(51) Int. Cl.
*B64F 1/28* (2006.01)
*B64D 37/00* (2006.01)
*F16L 37/38* (2006.01)

(52) U.S. Cl.
CPC ............ *B64F 1/28* (2013.01); *B64D 37/00* (2013.01); *F16L 37/38* (2013.01)

(58) Field of Classification Search
CPC . B64F 1/28; F16L 37/10; F16L 37/105; F16L 37/113; B67D 7/42; B67D 2007/0419; B67D 2007/0421; B64D 37/00; B64D 37/14; B64D 37/16; B64D 37/18
See application file for complete search history.

(56) References Cited

U.S. PATENT DOCUMENTS

| | | | | |
|---|---|---|---|---|
| 2,680,030 A | * | 6/1954 | Hoelzer | F16L 37/107 137/614.06 |
| 3,168,125 A | * | 2/1965 | Rosell | F16L 37/16 137/614.06 |
| 3,190,322 A | * | 6/1965 | Brown | B64D 39/06 141/383 |
| 4,078,577 A | * | 3/1978 | Brown | F16K 31/363 137/489.5 |
| 4,124,228 A | * | 11/1978 | Morrison | F16L 37/23 137/614.03 |
| 4,266,574 A | | 5/1981 | Tilling | |

(Continued)

*Primary Examiner* — Timothy L Maust
*Assistant Examiner* — Andrew StClair
(74) *Attorney, Agent, or Firm* — Shumaker, Loop & Kendrick, LLP; James D. Miller

(57) ABSTRACT

A nozzle adapter for coupling a fueling nozzle to an underwing type servicing adapter having a radially outward extending tab and a notch formed in an open end thereof comprises an outer body including a neck portion having a first conduit formed therein and a substantially cylindrical cap portion, the cap portion including at least one slot formed therein. An inner body has a second conduit formed therein and is disposed within the cap portion of the outer body and an annular channel is formed between the cap portion and the inner body. The at least one tab is received in the at least one slot and a rotation of the nozzle adapter relative to the servicing adapter causes a first aperture configured to receive a locking device therein to be aligned with the at least one notch of the servicing adapter.

13 Claims, 3 Drawing Sheets

(56) References Cited

U.S. PATENT DOCUMENTS

| | | | | |
|---|---|---|---|---|
| 4,275,860 | A | * | 6/1981 | Brabazon .................. B64F 1/28 |
| | | | | 114/261 |
| 4,567,924 | A | * | 2/1986 | Brown .................. B64D 37/16 |
| | | | | 137/797 |
| 5,009,252 | A | * | 4/1991 | Faughn ................. F16L 37/113 |
| | | | | 137/614.04 |
| 5,765,610 | A | * | 6/1998 | Brown .................. B64D 37/16 |
| | | | | 137/614.06 |
| 5,904,302 | A | * | 5/1999 | Brown ..................... B64F 1/28 |
| | | | | 137/614.06 |
| 6,234,224 | B1 | * | 5/2001 | Schultz, Jr. ............... B64F 1/28 |
| | | | | 141/301 |
| 7,182,098 | B2 | | 2/2007 | Tilling et al. |
| 7,798,184 | B2 | | 9/2010 | Schultz, Jr. et al. |
| 8,453,685 | B2 | | 6/2013 | Schultz, Jr. et al. |
| 8,763,956 | B2 | * | 7/2014 | Beck ........................ B64F 1/28 |
| | | | | 141/95 |
| 9,266,710 | B2 | * | 2/2016 | Fedde .................. B67D 7/3236 |
| 2009/0315729 | A1 | * | 12/2009 | Inhoffer .................... B64F 1/28 |
| | | | | 340/632 |
| 2010/0013216 | A1 | * | 1/2010 | Krywitsky ............ F16L 37/113 |
| | | | | 285/309 |
| 2014/0265303 | A1 | * | 9/2014 | Ismert .................. F16L 37/123 |
| | | | | 285/12 |

* cited by examiner

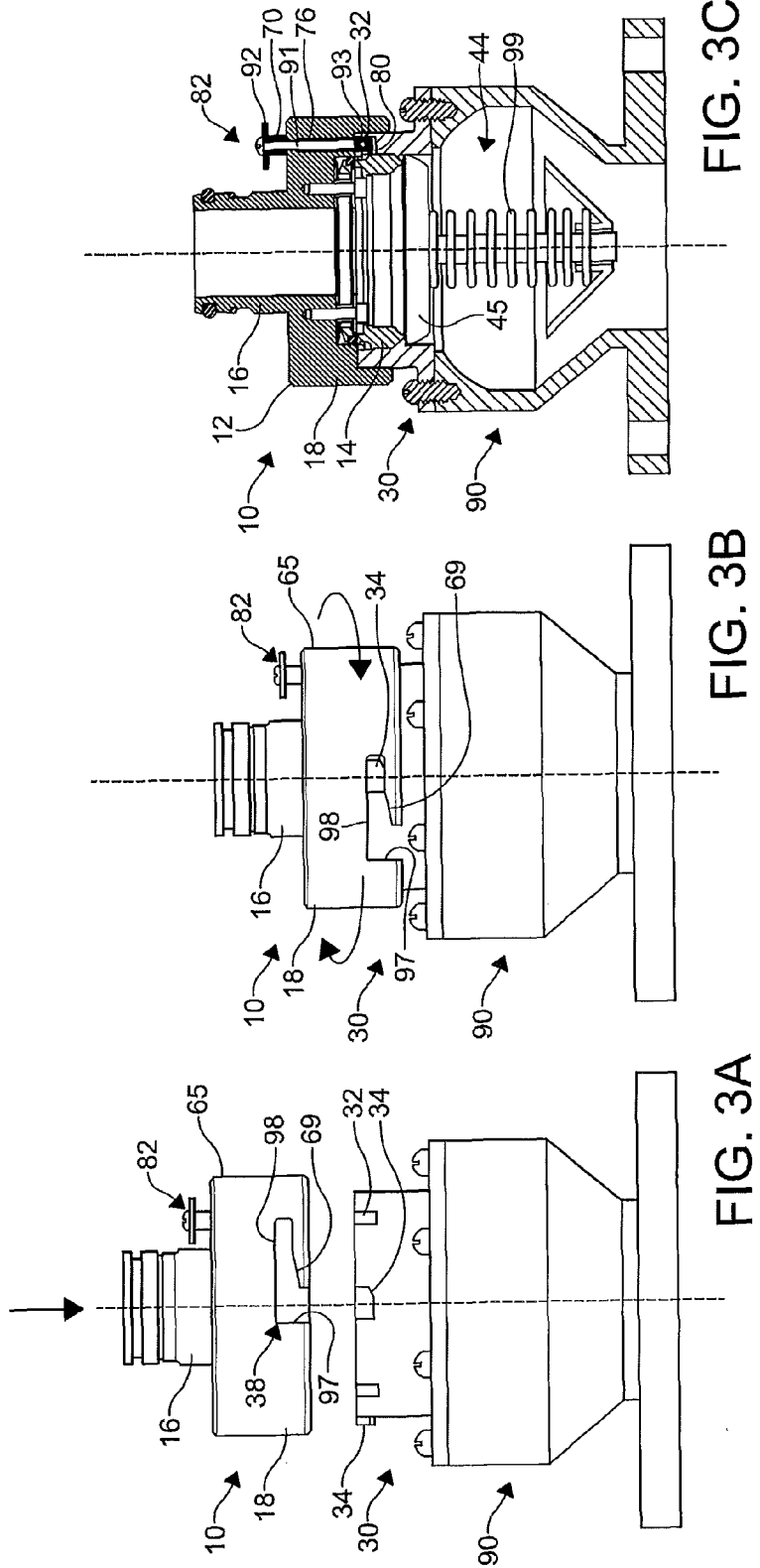

FUELING NOZZLE ADAPTER

CROSS-REFERENCE TO RELATED APPLICATIONS

This application claims priority to U.S. Provisional Application Ser. No. 62/010,128, filed Jun. 10, 2014, the entire disclosure of which is hereby incorporated herein by reference.

FIELD OF THE INVENTION

The present invention relates to an adapter for use with an overwing type fueling nozzle, and more specifically to an adapter for coupling an overwing type fueling nozzle to an underwing type fueling adapter.

BACKGROUND

Fueling nozzles for refueling an aircraft include "overwing" type nozzles and "underwing" type nozzles. The overwing type fueling nozzles are similar to a fuel or petrol station nozzles for refueling an automobile and include a spout that delivers the fuel through an opening above a fuel tank of the aircraft by means of gravity feeding. In contrast, the underwing type fueling nozzles are used when the fuel is pumped into the fuel tank of the aircraft through a single-point fueling port that is often located below the wing. The underwing type fueling nozzles are accordingly designed to be used with a dry break quick disconnect adapter. The dry break quick disconnect adapter allows the underwing type fueling nozzle to be disconnected from the adapter without spilling excessive amounts of the fuel by discontinuing a flow of the fuel through the nozzle when the underwing type fueling nozzle is not coupled to the adapter.

When using equipment for the refueling of an aircraft, it is frequently desirable to recirculate the fuel through the refueling system. The fuel may be recirculated through the refueling system to flush new hoses, following the replacement of a filter element, and for the testing of meters, additive systems, and interlocks, for example. The recirculation of the fuel may be accomplished by pumping the fuel through the fueling nozzle of the refueling system back into the fuel tank of the refueling system.

Many refueling systems already include or are easily adapted to include a dry break quick disconnect adapter acting as a recirculation inlet that is adapted to mate with an underwing type fueling nozzle to perform the recirculation of the fuel. Such dry break quick disconnect adapters are not adapted for use with an overwing type fueling nozzle having a traditional spout for delivering the fuel. Instead, the recirculation process requires that the overwing type fueling nozzle be placed into an inlet of the refueling system that delivers the fuel by gravity to the fuel tank of the refueling system. The recirculation of the fuel using the overwing type fueling nozzle may present a hazard in cases where accessing the inlet to the fuel tank of the refueling system is difficult such as when the inlet is located on the top of a truck-based tank. Additionally, the lack of a dry break interconnect between the overwing type fueling nozzle and the inlet may create the potential for splashing, spray, and the accumulation of fuel vapors, which also present potential hazards.

It would therefore be desirable to create an adapter for an overwing type fueling nozzle that allows the overwing type fueling nozzle to mate with a dry break disconnect adapter.

SUMMARY

In accordance with the present invention, an adapter for coupling an underwing type servicing adapter to an overwing type fueling nozzle is disclosed.

In an embodiment of the current invention, a nozzle adapter for fluidly coupling a fuel delivery device to an underwing type servicing adapter having at least one radially outward extending tab and at least one axially extending notch formed at an open end thereof is disclosed. The nozzle adapter comprises a main body having a first end and a second end, the first end configured to be removably coupled to the fuel delivery device and the second end having a channel and at least one slot formed therein, wherein the channel is configured to receive the open end of the servicing adapter therein and the at least one slot is configured to receive the at least one tab of the servicing adapter therein. The nozzle adapter further comprises a conduit extending from the first end to the second end providing fluid communication between the fuel delivery device and the servicing adapter.

In another embodiment of the invention, a nozzle adapter for coupling a fuel delivery device to an underwing type servicing adapter having at least one radially outward extending tab and at least one axially extending notch formed at an open end thereof is disclosed. The nozzle adapter comprises an outer body including a neck portion and a cap portion, the neck portion configured to be removably coupled to the fuel delivery device, an inner body disposed within the cap portion, wherein a channel is formed between an interior surface of the cap portion and an exterior surface of the inner body, the channel configured to receive the open end of the servicing adapter therein to removably couple the nozzle adapter to the servicing adapter, and a conduit extending through the outer body and the inner body, the conduit providing fluid communication between the fuel delivery device and the servicing adapter.

The invention also includes a method of coupling a nozzle adapter to an underwing type servicing adapter, the method comprising the steps of: providing a servicing adapter having at least one radially outward extending tab formed in an open end thereof; providing a nozzle adapter having a channel and at least one slot formed therein; inserting the open end of the servicing adapter into the channel and the at least one tab into the at least one slot; and rotating the nozzle adapter relative to the servicing adapter to form a fluid tight connection therebetween.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3A is a front elevational view illustrating a method of axially aligning the recirculation adapter and the fuel servicing adapter for coupling the recirculation adapter to the fuel servicing adapter;

Figure 1:
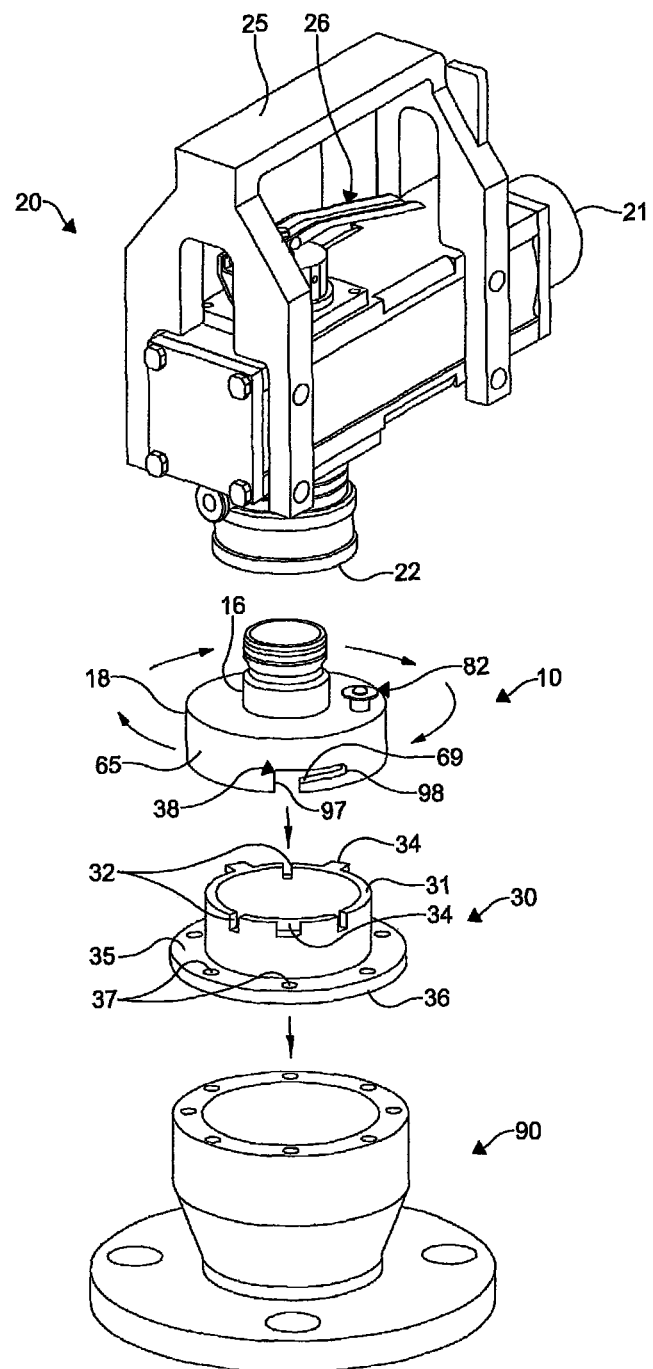
FIG. 1 is a partially exploded front perspective view of a fuel coupling arrangement including a fueling nozzle, a quick disconnect adapter, a fuel servicing adapter, and a recirculation adapter according to an embodiment of the current invention.

FIG. 3B is a front elevational view illustrating a method of rotating the recirculation adapter relative to the fuel servicing adapter to securely couple the recirculation adapter to the fuel servicing adapter; and FIG. 3C is a front cross-sectional elevational view illustrating the recirculation adapter and the fuel servicing adapter when coupled to each other and rotationally restricted by the insertion of a locking device into a notch formed in the fuel servicing adapter.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Additionally, the dimensions provided in the drawings are merely for purposes of explaining the invention, and are not necessary or critical to operation of the invention unless otherwise stated herein. In respect of the methods disclosed, the steps presented are exemplary in nature, and thus, the order of the steps is not necessary or critical.

FIGS. 1-3C illustrate a recirculation adapter 10 according to an embodiment of the invention. The recirculation adapter 10 is configured to couple a fueling nozzle 20 to a pressure fuel servicing adapter 30.

The fueling nozzle 20 may be any standard form of nozzle or other device used to deliver fuel from a source (not shown) of a fuel to a reservoir (not shown) such as a fuel tank, for example. The fueling nozzle 20 includes an inlet 21 and an outlet 22. The inlet 21 of the fueling nozzle 20 may be fluidly coupled to the source of the fuel via a hose (not shown) or other conduit. The outlet 22 of the fueling nozzle 20 may normally be coupled to a spout (not shown). The spout may be substantially cylindrical or may transition from a cylindrical shape at one end to a substantially flattened portion at another end suited for mating with fuel receptacles adapted to receive jet fuel, for example. The spout may be removably coupled to the outlet 22 of the fueling nozzle 20 using any known method, including the use of a quick disconnect swivel. The quick disconnect swivel may feature a ball release design or a spring wire, as non-limiting examples. In other embodiments, a threaded connection with a locking nut may be used, as desired. The fueling nozzle 20 may further include a handle 25, a lever assembly 26, and an internal valve assembly (not shown). The lever assembly 26 may be mechanically linked to the internal valve assembly in a manner wherein a change of inclination of the lever assembly 26 may cause the internal valve assembly to provide fluid communication between the inlet 21 of the fueling nozzle 20 and the outlet 22 thereof. Although the fueling nozzle 20 has been described as being substantially similar to a standard fueling nozzle, any suitable fuel delivery device having an outlet suitable for coupling with the recirculation adapter 10 may be used without departing from the scope of the present invention, as desired.

The servicing adapter 30 may be any standard adapter for use with a known underwing type fueling nozzle such as a standard underwing type quick disconnect adapter, for example. The servicing adapter 30 is substantially cylindrical in shape and may include notches 32 formed in an open first end 31 thereof. The notches 32 may be formed in an annular array about a circumference of the servicing adapter 30, wherein the notches 32 may be equally spaced about a perimeter of the open first end 31 of the servicing adapter 30. Interposed between the notches 32 is a plurality of tabs 34 extending radially outwardly from an outer circumferential surface of the first end 31 of the servicing adapter 30, wherein the tabs 34 may also be positioned in an annular array about the circumference of the servicing adapter 30 and spaced apart from each other in similar fashion to the notches 32.

The servicing adapter 30 may also include an annular flange 35 formed at a second open end 36 of the servicing adapter 30. The flange 35 may include an annular array of apertures 37 formed therein for coupling the servicing adapter 30 to a quick disconnect adapter 90. The quick disconnect adapter 90 provides fluid communication between the servicing adapter 30 and a fuel reservoir to which the quick disconnect adapter 90 is coupled. The fuel reservoir may be a fuel tank included on a vehicle or may be the fuel source (not shown) from which the inlet 21 of the fueling nozzle 20 receives the fuel. Accordingly, the servicing adapter 30 in some circumstances may be used to recirculate fuel originating from the fuel source through the fueling nozzle 20 and back into the fuel source, as desired.

Figure 2:
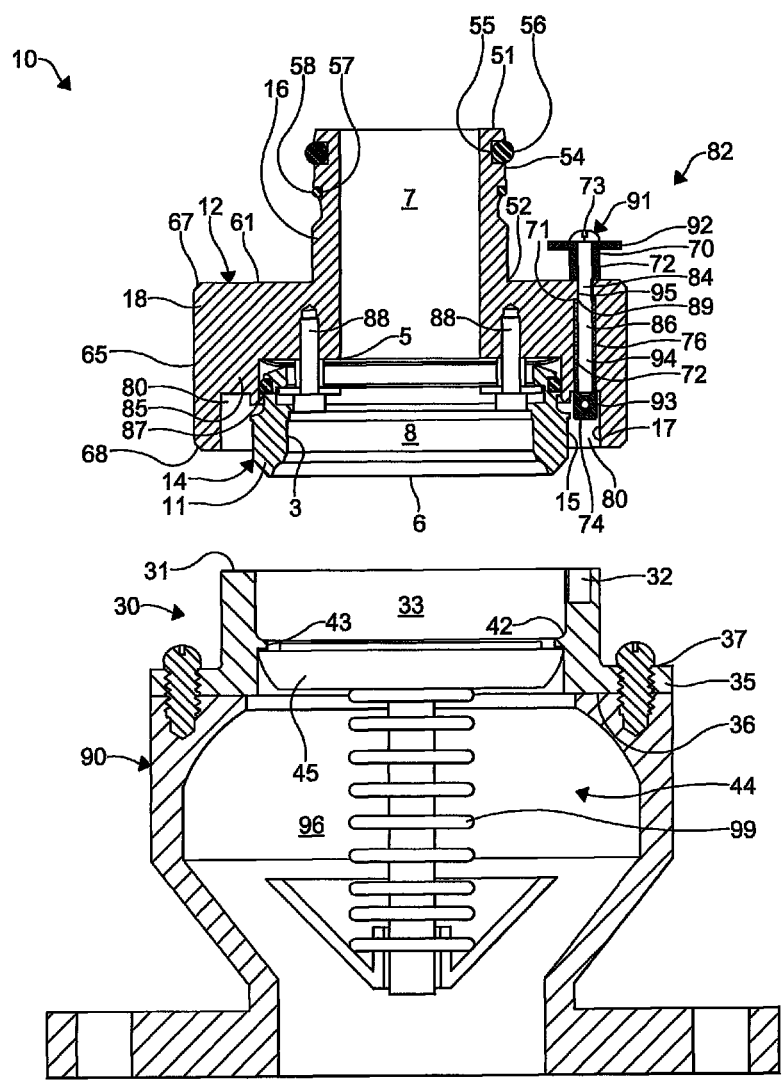
FIG. 2 is a partially exploded front cross-sectional elevational view of the recirculation adapter, fuel servicing adapter, and quick disconnect adapter illustrated in FIG. 1.

Referring now to FIG. 2, the open first end 31 of the servicing adapter 30 forms an inlet into a substantially cylindrical passageway 33 in fluid communication with a hollow interior 96 of the quick disconnect adapter 90. The servicing adapter 30 may include a sealing surface 42 formed within the passageway 33 between the first open end 31 and the second open end 36 thereof. The sealing surface 42 may extend radially inward from an interior wall of the servicing adapter 30 defining the passageway 33 and may be spaced apart from the open first end 31 by a distance greater than a height of the notches 32. A radially inward edge of the sealing surface 42 defines an opening 43.

A poppet 44 having a poppet head 45 may be disposed within the hollow interior 96 of the quick disconnect adapter 90 and the poppet head 45 may extend into the passageway 33 of the servicing adapter 30. The poppet head 45 may be configured to sealingly engage the sealing surface 42 at or adjacent the edge thereof defining the opening 43. The poppet head 45 is normally urged in a direction toward the opening 43 by a spring or other suitable biasing device 99 to maintain the servicing adapter 30 in a closed position when not in use. Fuel is able to flow around the poppet head 45 when the poppet head 45 is spaced apart from the opening 43 in a direction against the urging of the biasing device 99, allowing the fuel to enter the hollow interior 96 of the quick disconnect adapter 90 before flowing toward the fuel reservoir to which the quick disconnect adapter 90 is coupled.

The recirculation adapter 10 is removably coupled to each of the outlet 22 of the fueling nozzle 20 and the servicing adapter 30. The recirculation adapter 10 is formed from a main body that may comprise an outer body 12 and an inner body 14, as shown in FIG. 2. The outer body 12 includes a neck portion 16 and a cap portion 18. The inner body 14 is disposed within the outer body 12 and an annular channel 80 is formed between and defined by an interior surface 17 of the cap portion 18 and an exterior surface 15 of the inner body 14. The annular channel 80 is configured to receive the first end 31 of the servicing adapter 30 when the recirculation adapter 10 is coupled to the servicing adapter 30.

The neck portion 16 is substantially cylindrical and includes a first end 51 and a second end 52. A substantially planar annular surface 61 of the cap portion 18 extends radially outwardly from the second end 52 of the neck portion 16. A first conduit 7 is formed through an entirety of the neck portion 16 from the first end 51 to the second end 52 thereof. The first conduit 7 provides fluid communication between the outlet 22 of the fueling nozzle 20 and a second conduit 8 formed within the inner body 14. The first conduit 7 may be substantially cylindrical in shape as a non-limiting example. An outer surface 54 of the neck portion 16 may include a first annular indentation 55 having a first seal 56 disposed therein. The first seal 56 is also annular in shape and may be any suitable type of seal, such as an O-ring, for example. The outer surface 54 of the neck portion 16 may further include a second annular indentation 57 formed therein between the first annular indentation 55 and the second end 52 of the neck portion 16. The second annular indentation 57 may include a second seal 58 disposed therein. The second seal 58 is annular in shape and may also be any suitable type of seal, such as an O-ring, for example.

A coupling of the neck portion 16 of the recirculation adapter 10 to the outlet 22 of the fueling nozzle 20 may be dependent on the coupling means used to couple the outlet 22 of the fueling nozzle 20 to the spout 24. Accordingly, the coupling of the neck portion 16 of the recirculation adapter 10 may include a quick disconnect swivel coupling having one of a ball release sleeve design and a spring wire, as desired. In other embodiments, a threaded connection with a locking nut may be used. However, it should be understood that any structure for removably coupling the recirculation adapter 10 to the outlet 22 of the fueling nozzle 20 while maintaining a fluid tight seal therebetween may be used without departing from the scope of the present invention.

The annular surface 61 of the cap portion 18 extends radially outward until terminating at a peripheral circumferential surface 65 of the cap portion 18. The circumferential surface 65 extends from a first end 67 thereof formed at an intersection of the annular surface 61 and the circumferential surface 65 to a second end 68 thereof, wherein the second end 68 is spaced apart from the first end 67 in an axial direction of the cap portion 18.

Referring back to FIG. 1, the cap portion 18 of the outer body 12 may include an annular array of slots 38 formed therein. The slots 38 extend through the cap portion 18 from the circumferential surface 65 thereof to the interior surface 17 thereof to provide access to the annular channel 80 formed between the outer body 12 and the inner body 14. Each of the slots 38 may be substantially L-shaped and may include a first leg 97 extending from the second end 68 of the circumferential surface 65 in a direction toward the first end 67 thereof and a second leg 98 extending from an end of the first leg 97 around at least a portion of the circumference of the circumferential surface 65 in a direction transverse to the first leg 67. The second leg 98 of each of the slots 38 may also include at least one angled surface 69 arranged at an angle with respect to a plane formed by the second end 68 of the cap portion 18. The at least one angled surface 69 may facilitate a secure connection between the recirculation adapter 10 and the servicing adapter 30 when coupled to each other.

The slots 38 are configured to receive one of the tabs 34 formed on the servicing adapter 30. Accordingly, the number of slots 38 formed in the cap portion 18 are dependent on the number of tabs 34 formed on the servicing adapter 30. Although FIG. 1 depicts only one of the slots 38 formed in the recirculation adapter 10, it should be understood that the recirculation adapter 10 illustrated in FIGS. 1-3C includes three of the slots 38 to correspond to the three tabs 34 formed in the servicing adapter 30 illustrated in FIGS. 1, 3A, 3B, and 3C. Similarly, a spacing of the slots 38 about the circumferential surface 65 may be dependent on a spacing of the tabs 34 about the open first end 31 of the servicing adapter 30. Although described herein as being substantially L-shaped, the slots 38 may have any suitable shape for tightly and securely coupling the recirculation adapter 10 to the servicing adapter 30 when the tabs 34 of the servicing adapter 30 are disposed therein.

The interior surface 17 of the cap portion 18 includes a shoulder 85 extending radially inwardly therefrom. A radially inward surface of the shoulder 85 abuts the exterior surface 15 of the inner body 14. The shoulder 85 is axially spaced apart from the second end 68 of the cap portion 18 to form the annular channel 80. A third seal 87 may be disposed between the exterior surface 15 of the inner body 14 and the shoulder 85 of the cap portion 18 to provide a fluid tight seal therebetween, militating against fluid flowing through the recirculation adapter 10 from entering the annular channel 80. The third seal 87 is annular in shape and may be any suitable type of seal, such as an O-ring, for example. In some embodiments, the shoulder 85 of the cap portion 18 may further include a coupling means formed thereon for coupling the inner body 14 with the cap portion 18. The coupling means may be female threading formed on a radially interior surface of the shoulder 85 cooperating with male threading formed on the exterior surface 15 of the inner body 14, as a non-limiting example. However, in the embodiment illustrated in FIG. 2, the inner body 14 is shown as being coupled to the cap portion 18 by a pair of axially extending connectors 88. The connectors 88 may be screws, bolts, pins, or any suitable coupling means, as desired.

The recirculation adapter 10 further includes a locking assembly 82 comprising a locking device 91 and a biasing element 76. The locking device 91 may for instance be an elongate member such as a pin, bolt, or machine screw, as non-limiting examples. The locking device 91 may include a stopper 92 or head formed at a first end 73 thereof, a detent pin 93 formed at a second end 74 thereof, and an elongate body 94 extending therebetween, wherein each of the stopper 92 and the detent pin 93 have a larger outer diameter than the body 94. The annular surface 61 of the cap portion 18 includes a first aperture 95 formed therein for receiving the locking device 91. The first aperture 95 extends through the cap portion 18 and provides access to the annular channel 80. The first aperture 95 may be formed to have a first portion 84 formed adjacent the annular surface 61 and a second portion 86 formed adjacent the annular channel 80. The first portion 84 may have a first inner diameter while the second portion 86 may have a second inner diameter, wherein the second inner diameter is larger than the first inner diameter. The first inner diameter of the first portion 84 is large enough to receive the body 94 of the locking device 91 therethrough, but the first inner diameter is also small enough to disallow either of the stopper 92 or the detent pin 93 from passing therethrough, causing the locking device 91 to be at least partially constrained within the first portion 84 of the first aperture 95.

The annular surface 61 of the cap portion 18 may further include a spacer 70 disposed over and aligned with the first aperture 95. The spacer 70 includes an opening 72 formed therethrough having an inner diameter substantially equal to the first inner diameter of the first portion 84 of the first aperture 95. Accordingly, the body 94 of the locking device 91 is able to reciprocate within both the opening 72 of the spacer 70 and the first portion 84 of the first aperture 95 while the stopper 92 and the detent pin 93 prevent the locking device 91 from being removed from the recirculation adapter 10. When not in use, the stopper 92 of the locking device 91 may be configured to normally rest on the spacer 70 while the detent pin 93 portion of the locking device 91 is normally extending at least partially out of the first aperture 95 and into the annular channel 80, as shown in FIG. 2.

The biasing element 76 may include a first end 71 and a second end 72. The first end 71 may abut an edge 89 formed within the first aperture 95 and defining a boundary between the first portion 84 and the second portion 86 thereof. The second end 72 may abut a surface of the detent pin 93 having a larger diameter than the body 94 of the locking device 91. The biasing element 76 may accordingly be configured to apply a force on the detent pin 93, and therefore the remainder of the locking device 91, in a direction toward the annular channel 80 when the detent pin 93 is caused to be moved and compressed in a direction away from the annular channel 80. The biasing device 76 may accordingly be a compression spring, for example. However, it should be understood by one skilled in the art that any form of biasing device capable of urging the locking device 91 in a direction toward the annular channel 80 may be used while remaining within the scope of the present invention. For instance, in place of the biasing element 76 disposed within the first aperture 95, the biasing device may be a spring clip (not shown) or other similar device having a first end securely coupled to the annular surface 61 and a second end securely coupled to the first end 73 of the locking device 91, wherein movement of the first end 73 of the locking device 91 in a direction away from the annular channel 80 causes the spring clip to urge the locking device back in a direction toward the annular channel 80 due to a resiliency of the spring clip.

The inner body 14 includes an interior surface 3 defining the second conduit 8. The second conduit 8 may have a profile selected to impart desired flow characteristics on a liquid fuel flowing through the inner body 14, such as militating against an undesirable pressure drop within the second conduit 8. The second conduit 8 provides fluid communication between the first conduit 7 and an interior of the servicing adapter 30 having the sealing surface 42 and the poppet 44.

A first end 5 of the inner body 14 abuts the outer body 12 adjacent the second end 52 of the neck portion 16 and the shoulder 85. A second end 6 of the inner body 14 may include a nose seal 11 formed thereon. The nose seal 11 is annular in shape and may include a sloped surface facing in a direction toward the annular channel 80. The nose seal 11 is adapted to provide a seal between the recirculation adapter 10 and the servicing adapter 30 adjacent the sealing surface 42 formed within the servicing adapter 30 when the recirculation adapter 10 and the servicing adapter 30 are coupled to each other. When the nose seal 11 abuts the sealing surface 42, the second conduit 8 is arranged concentrically with the opening 43 having the poppet 44 disposed therein.

In use, a user first decouples the spout from the outlet 22 of the fueling nozzle 20. The user then replaces the spout with the recirculation adapter 10 by inserting the neck portion 16 thereof into the outlet 22 of the fueling nozzle 20 to couple the recirculation adapter 10 to the fueling nozzle 20 while providing fluid communication between the outlet 22 and the first conduit 7 formed in the neck portion 16 of the recirculation adapter 10. As described hereinabove, any known method of coupling the recirculation adapter 10 to the fueling nozzle 20 may be used, as desired, and may be dependent on the type of fueling nozzle 20 being used.

Once the recirculation adapter 10 is coupled to the fueling nozzle 20, the user then positions the recirculation adapter 10 to receive a portion of the servicing adapter 30 therein, as best shown in FIG. 3A. Specifically, the user aligns the open first end 31 of the servicing adapter 30 with the annular channel 80 formed between the outer body 12 and the inner body 14 while also aligning the three tabs 34 formed on the servicing adapter 30 with the three slots 38 formed in the cap portion 18. Each of the tabs 34 is then inserted into the first leg 97 of each of the corresponding slots 38 until each of the tabs 34 is also aligned with the second leg 98 of each of the corresponding slots 38. The recirculation adapter 10 is then rotated with respect to the servicing adapter 30 to place each of the tabs 34 into the second leg 98 of each of the slots 38, as best shown in FIG. 3b. The second leg 98 of each of the slots 38 may be ramped or disposed at an angle or may include the angled surface 69 to cause the recirculation adapter 10 to be pressed tightly against the servicing adapter 30 following rotation of the recirculation adapter 10. The locating of the tabs 34 within the second leg 98 of each of the slots 38 ensures that the recirculation adapter 10 does not move axially with respect to the servicing adapter 30 when coupled thereto.

Once properly positioned and rotated, the rotational position of the recirculation adapter 10 relative to the servicing adapter 30 is secured via the locking assembly 82, as best shown in FIG. 3c. This occurs because the detent pin 93 disposed at the second end 74 of the locking device 91 is normally caused to extend at least partially into the annular channel 80 due to the presence of the biasing element 76. When the annular channel 80 receives the open first end 31 of the servicing adapter 30 therein, the surface forming the open first end 31 will contact the detent pin 93 and cause it to be moved in a direction away from the annular channel 80 and toward the spacer 70. The biasing element 76 is therefore compressed and applies a force to the detent pin 93 in a direction toward the annular channel 80. Once the recirculation adapter 10 has been sufficiently rotated relative to the servicing adapter 30 to place each of the tabs 34 within the second leg 98 of each of the slots 38, the detent pin 93 will have been rotated to a position wherein the detent pin 93 is aligned with one of the notches 32 formed in the open first end 31 of the servicing adapter 30. The urging of the biasing element 76 causes the detent pin 93 to move axially into the notch 32 of the servicing adapter 30, thereby preventing further rotational movement of the servicing adapter 30 relative to the recirculation adapter 10.

Once in the fully coupled position, the nose seal 11 formed on the second end 6 of the inner body 14 is pressed tightly against the sealing surface 42 of the servicing adapter 30 and/or the wall defining the passageway 33 to provide a substantially fluid tight seal therebetween. The user may then pull the handle 25 of the fueling nozzle 20, thereby causing the lever assembly 26 and the internal valve assembly to cause liquid fuel to exit the outlet 22 of the fueling nozzle 20 and flow through the first conduit 7 and the second conduit 8 before entering the passageway 33 of the servicing adapter 30. The flow of the liquid fuel and a pressure of the liquid fuel causes the poppet head 45 to be displaced from the sealing surface 42 and the opening 43 against the urging of the biasing device 99, thereby opening the poppet 44 and allowing the liquid fuel to enter the fuel containing receptacle to which the servicing adapter 30 is coupled via the hollow interior 96 of the quick disconnect adapter 90.

The recirculation adapter 10 may then be removed from the servicing adapter 30 by first removing the detent pin 93 from the one of the notches 32 formed in the servicing adapter 30. The spacer 70 provides a gap between the stopper 92 of the locking device 91 and the annular surface 61 to allow a user to more easily grasp the stopper 92 from the side or underside of the stopper 92. Once the stopper 92 is grasped, the user may pull the stopper 92 and therefore the remainder of the locking device 91 in a direction away from the annular channel 80, thereby removing the detent pin 93 from the notch 32 against the urging of the biasing element 76. Once the detent pin 93 has been removed, the recirculation adapter 10 may once again be rotated relative to the servicing adapter 30 to remove each of the tabs 34 from the second leg 98 of each of the slots 38. The recirculation adapter 10 may then be moved axially to remove each of the tabs 34 from the first leg 97 of each of the slots 38, thereby decoupling the recirculation adapter 10 from the servicing adapter 30.

It should be understood that the recirculation adapter 10 may be used for any suitable purpose in addition to the recirculating of fuel. For example, the recirculation adapter 10 may be used to fuel an aircraft having a suitable servicing adapter 30 coupled thereto. Furthermore, although the recirculation adapter 10 is described as having three of the slots 38 formed therein, it should be understood that the recirculation adapter 10 may have any number of the slots 38 to correspond to the number of tabs 34 formed in the first end 31 of the servicing adapter 30. Accordingly, the recirculation adapter 10 may be adapted for use with various different types and configurations of servicing adapters 30.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel recirculation system comprising:
    a fuel reservoir including an inlet and an outlet, a fuel stored in the fuel reservoir configured to flow from the outlet of the fuel reservoir to the inlet of the fluid reservoir in a first flow direction;
    an overwing type fuel delivery device disposed downstream of the outlet of the fuel reservoir with respect to the first flow direction, the overwing type fuel delivery device including an outlet, a hand-manipulated lever assembly, and an internal valve assembly selectively controlling a flow of fuel through the outlet of the overwing type fuel delivery device in response to a manipulating of the hand-manipulated lever assembly;
    an underwing type servicing adapter having a passageway for communicating the fuel therethrough, the underwing type servicing adapter disposed upstream of the inlet of the fuel reservoir with respect to the first flow direction, the underwing type servicing adapter having at least one radially outwardly extending tab and at least one axially extending notch formed in an open end thereof; and
    a recirculation adapter including:
        a main body having a first end and a second end, the first end configured to be removably coupled to the outlet of the overwing type fuel delivery device and the second end configured to be removably coupled to the underwing type servicing adapter, the second end of the main body having a channel and at least one slot formed therein, wherein the channel is configured to receive the open end of the underwing type servicing adapter therein and the at least one slot is configured to receive the at least one tab of the underwing servicing adapter therein; and
        a conduit extending from the first end to the second end of the main body and configured to provide fluid communication between the outlet of the overwing type fuel delivery device and the passageway of the underwing type servicing adapter, wherein the fuel disposed within the fuel reservoir flows in the first flow direction in order through the outlet of the fuel reservoir, the outlet of the overwing type fuel delivery device, the conduit of the recirculation adapter, the passageway of the underwing type servicing adapter, and the inlet of the fuel reservoir in response to the manipulating of the lever assembly of the overwing type fuel delivery device when the first end of the main body of the recirculation adapter is coupled to the outlet of the overwing type fuel delivery device and the second end of the main body of the recirculation adapter is coupled to the underwing type servicing adapter; and
    a quick disconnect adapter disposed between the underwing type servicing adapter and the inlet of the fuel reservoir, the quick disconnect adapter having a hollow interior including a poppet having a poppet head and a biasing device, the biasing device normally biasing the poppet head against a sealing surface formed by the underwing type servicing adapter to prevent fluid communication between the outlet of the overwing type fuel delivery device and the inlet of the fuel reservoir prior to the manipulating of the lever assembly of the overwing type fuel delivery device.

2. The fuel recirculation system of claim 1, wherein the main body of the recirculation adapter includes at least one slot formed therein for receiving the at least one tab of the servicing adapter.

3. The fuel recirculation system of claim 2, wherein the at least one slot includes a first leg extending in an axial direction of the main body of the recirculation adapter and a second leg extending in a direction transverse to the first leg.

4. The fuel recirculation system of claim 3, wherein the second leg includes an angled surface extending in a direction away from a plane defined by the second end of the main body of the recirculation adapter.

5. The fuel recirculation system of claim 1, further comprising a locking device disposed in an aperture formed in the main body of the recirculation adapter, wherein at least a portion of the locking device extends into the channel.

6. The fuel recirculation system of claim 5, wherein the locking device is configured to be aligned with the at least one notch formed in the underwing type servicing adapter when the recirculation adapter is coupled to the underwing type servicing adapter to cause the locking device to extend into the at least one notch, thereby restricting rotational movement of the recirculation adapter relative to the underwing type servicing adapter.

7. The fuel recirculation system of claim 5, further comprising a biasing element configured to urge the locking device in a direction toward the channel.

8. The nozzle adapter of claim 1, wherein the main body of the recirculation adapter includes a nose seal configured to provide a fluid tight seal between the recirculation adapter and a surface of the underwing type servicing adapter.

9. The fuel recirculation system of claim 1, wherein the manipulating of the lever assembly of the overwing type fuel delivery device causes the fuel flowing in the first flow direction to apply pressure to the poppet head to disengage the poppet head from the sealing surface against the bias of the biasing device to establish fluid communication between the outlet of the overwing type fuel delivery device and the inlet of the fuel reservoir.

10. The fuel recirculation system of claim 1, wherein the outlet of the overwing type fuel delivery device is configured to removably receive a spout when the outlet of the overwing type fuel delivery device is not coupled to the first end of the main body of the recirculation adapter.

11. A method of operating the fuel recirculation system of claim 1 including the steps of:
 coupling the first end of the main body of the recirculation adapter to the outlet of the overwing type fuel delivery device;
 coupling the second end of the main body of the recirculation adapter to the underwing type servicing adapter; and
 manipulating the lever assembly of the overwing type fuel delivery device to cause the fuel to flow in the first flow direction from the outlet of the fuel reservoir to the inlet of the fuel reservoir.

12. The method of claim 11, further including a step of removing a spout from the outlet of the overwing type fuel delivery device prior to the step of coupling the first end of the main body of the recirculation adapter to the outlet of the overwing type fuel delivery device.

13. The method of claim 11, wherein the manipulating of the lever assembly of the overwing type fuel delivery device causes the fuel flowing in the first flow direction to apply pressure to a poppet head to disengage the poppet head from a sealing surface against a bias of a biasing device to establish fluid communication between the outlet of the overwing type fuel delivery device and the inlet of the fuel reservoir.

* * * * *